United States Patent
Qi et al.

(10) Patent No.: US 10,310,761 B2
(45) Date of Patent: Jun. 4, 2019

(54) STORAGE DEVICE WITH DYNAMIC CONFIGURATION

(71) Applicant: Shanghai Zhaoxin Semiconductor Co., Ltd., Shanghai (CN)

(72) Inventors: Zongpu Qi, Beijing (CN); Di Hu, Beijing (CN); Wei Zhao, Beijing (CN); Zheng Wang, Beijing (CN); Xiaoyang Li, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 15/797,617

(22) Filed: Oct. 30, 2017

(65) Prior Publication Data
US 2019/0079687 A1    Mar. 14, 2019

(30) Foreign Application Priority Data

Sep. 12, 2017    (CN) .............................. 2017 1 081629

(51) Int. Cl.
*G06F 3/06*    (2006.01)
(52) U.S. Cl.
CPC .......... *G06F 3/0632* (2013.01); *G06F 3/0604* (2013.01); *G06F 3/064* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2007/0064006 A1* | 3/2007 | Saxena | G09G 5/39 345/557 |
| 2009/0138658 A1* | 5/2009 | Dreslinski, Jr. | G06F 12/0864 711/118 |
| 2011/0153944 A1* | 6/2011 | Kursawe | G06F 12/0802 711/122 |
| 2016/0350229 A1* | 12/2016 | Reed | G06F 12/0864 |
| 2016/0357664 A1* | 12/2016 | Reed | G06F 12/0864 |
| 2016/0357681 A1* | 12/2016 | Reed | G06F 12/0864 |
| 2017/0091112 A1* | 3/2017 | Emma | G06F 12/0877 |

FOREIGN PATENT DOCUMENTS

CN    102541754 A  *  7/2012

* cited by examiner

*Primary Examiner* — Kevin Verbrugge
(74) *Attorney, Agent, or Firm* — McClure, Qualey & Rodack, LLP (57) ABSTRACT

A storage device includes a memory unit, an access monitor, and a memory configurator. The memory unit includes a plurality of memory blocks. The access monitor is configured to monitor whether an access mode of the memory unit is a continuous-access mode or a random-access mode, to generate a monitor signal. The memory configurator configures, according to the monitor signal, any of the memory blocks to be either in a cache mode or a SRAM state to generate a configuration signal.

20 Claims, 5 Drawing Sheets

STORAGE DEVICE WITH DYNAMIC CONFIGURATION

CROSS REFERENCE TO RELATED APPLICATIONS

This Application claims priority of China Patent Application No. 201710816269.0, filed on Sep. 12, 2017, the entirety of which is incorporated by reference herein.

BACKGROUND OF THE INVENTION

Field of the Invention

The disclosure relates generally to a storage device, which is able to have its access mode dynamically adjusted, and a configuration method thereof.

Description of the Related Art

Generally, the access mode of a storage device can't be dynamically adjusted after it has been configured to be a static random-access memory mode or a cache mode. Even though in hybrid architecture coexisting with the static random-access memory and the cache, the access mode has to be set during the initialization procedure by the user or software, such that the ability of dynamic and real-time configuration becomes very important for some target loads for which a suitable mode can't be determined beforehand. Therefore, a storage device and a configuration method in which the access mode can be dynamically adjusted are required.

BRIEF SUMMARY OF THE INVENTION

In an embodiment, a storage device comprises a memory unit, an access monitor, and a memory configurator. The memory unit comprises a plurality of memory blocks. The access monitor is configured to monitor whether an access mode of the memory unit is a continuous-access mode or a random-access mode, to generate a monitor signal. The memory configurator configures, according to the monitor signal, any of the memory blocks to be either in a cache mode or a static random-access memory mode to generate a configuration signal.

According to an embodiment of the invention, the access monitor monitors whether the access mode of a predetermined address range in the memory unit is the continuous-access mode or the random-access mode. When an address of an access request seeking access to the memory unit exceeds the predetermined address range, the access monitor generates the monitor signal to inform the memory configurator.

According to an embodiment of the invention, the storage device further comprises a cache controller, a static random-access memory controller, and a routing unit. When the memory configurator configures a first memory block of the memory blocks in the memory unit to be in the cache mode, the cache controller operates the first memory block according to the configuration signal. When the memory configurator configures a second memory block of the memory blocks in the memory unit to be in the static random-access memory mode, the static random-access memory controller operates the second memory block according to the configuration signal. The routing unit routes an access request to the cache controller or the static random-access memory controller according to the configuration signal and an address of the access request from an execution unit, so that the execution unit is able to access the memory unit.

According to an embodiment of the invention, the access monitor further comprises a monitor unit, a continuous-access counter, and a random-access counter. The monitor unit monitors whether addresses of two continuous access requests seeking access to the memory unit are continuous. When the addresses of the two continuous access requests are continuous, the monitor generates a first signal. When a difference between the addresses of the two continuous access requests exceeds a predetermined range, the monitor unit generates a second signal. The continuous-access counter increases a continuous-access count according to the first signal. The random-access counter increases a random-access count according to the second signal.

According to an embodiment of the invention, when the continuous-access count exceeds the random-access count by a first difference value, the memory configurator configures a first number of memory blocks in the memory unit to be in the static random-access memory mode and configures a second number of memory blocks to be in the cache mode, where the first number exceeds the second number.

According to another embodiment of the invention, when the random-access count exceed the continuous-access count by a second difference value, the memory configurator configures a first number of memory blocks in the memory unit to be in the cache mode and configures a second number of memory blocks to be in the static random-access memory mode, where the first number exceeds the second number.

According to an embodiment of the invention, when an address of an access request seeking access to the memory unit exceeds a predetermined address range, the access monitor generates the monitor signal to inform the memory configurator to read the continuous-access count and the random-access count.

According to another embodiment of the invention, at fixed time intervals, the access monitor generates the monitor signal to inform the memory configurator to read the continuous-access count and the random-access count.

According to an embodiment of the invention, the memory configurator records configuration information, where the configuration information comprises an address range of the memory blocks configured to be in the cache mode and an address range of the memory blocks configured to be in the static random-access memory mode. The memory configurator generates the configuration signal according to the configuration information.

According to an embodiment of the invention, the storage device is deposited in a hardware accelerator, wherein the memory unit is configured to buffer payloads of the hardware accelerator.

In an embodiment, a configuration method, which adapted in a memory unit comprising a plurality of memory blocks, comprises: monitoring whether an access mode of the memory unit is a continuous-access mode or a random-access mode, to generate a monitor signal; and configuring any of the memory blocks to be either in a cache mode or a static random-access memory mode according to the monitor signal, to generate a configuration signal.

According to an embodiment of the invention, the step of monitoring whether the access mode of the memory unit is the continuous-access mode or the random-access mode to generate a monitor signal further comprises: monitoring whether an access mode on a predetermined address range in the memory unit is the continuous-access mode or the random-access mode; and when an address of an access request seeking access to the memory unit exceeds the predetermined address range, generating the monitor signal to configure any of the memory blocks to be either in the cache mode or the static random-access memory mode.

According to an embodiment of the invention, the configuration method further comprises: when a first memory block of the memory blocks in the memory unit is configured to be in the cache mode, operating the first memory block according to the configuration signal via a cache controller; when a second memory block of the memory blocks in the memory unit is configured to be in the static random-access memory mode, operating the second memory block according to the configuration signal via a static random-access memory controller; and routing an access request to the cache controller or the static random-access memory controller according to the configuration signal and the address of the access request from an execution unit.

According to an embodiment of the invention, the step of monitoring whether the access mode of the memory unit is the continuous-access mode or the random-access mode to generate the monitor signal further comprises: monitoring whether addresses of two continuous access requests seeking access to the memory unit are continuous; generating a first signal when the addresses of the two continuous access requests are continuous; increasing a continuous-access count according to the first signal; generating a second signal when a difference of the addresses of the two continuous access requests exceeds a predetermined range; and increasing a random-access count according to the second signal.

According to an embodiment of the invention, the step of monitoring whether the access mode of the memory unit is the continuous-access mode or the random-access mode to generate the monitor signal further comprises: when the continuous-access count exceeds the random-access count by a first difference value, configuring a first number of memory blocks in the memory unit to be in the static random-access memory mode and configuring a second number of memory blocks in the memory unit to be in the cache mode, wherein the first number exceeds the second number.

According to another embodiment of the invention, the step of monitoring whether the access mode of the memory unit is the continuous-access mode or the random-access mode to generate the monitor signal further comprises: when the random-access count exceeds the continuous-access count by a second difference value, configuring a first number of memory blocks in the memory unit to be in the cache mode and configuring a second number of memory blocks in the memory unit to be in the static random-access memory mode, wherein the first number exceeds the second number.

According to an embodiment of the invention, the step of monitoring whether the access mode of the memory unit is the continuous-access mode or the random-access mode to generate the monitor signal further comprises: when an address of an access request seeking access to the memory unit exceeds a predetermined address range, generating the monitor signal; and reading the continuous-access count and the random-access count according to the monitor signal.

According to another embodiment of the invention, the step of monitoring whether the access mode of the memory unit is the continuous-access mode or the random-access mode to generate the monitor signal further comprises: generating the monitor signal at fixed time intervals; and reading the continuous-access count and the random-access count according to the monitor signal.

According to an embodiment of the invention, the configuration method further comprises: recording configuration information, wherein the configuration information comprises an address range of the memory blocks configured to be in the cache mode and an address range of the memory blocks configured to be in the static random-access memory mode; and generating the configuration signal according to the configuration information.

According to an embodiment of the invention, the memory unit is deposited in a hardware accelerator, wherein the memory unit is configured to buffer payloads of the hardware accelerator.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
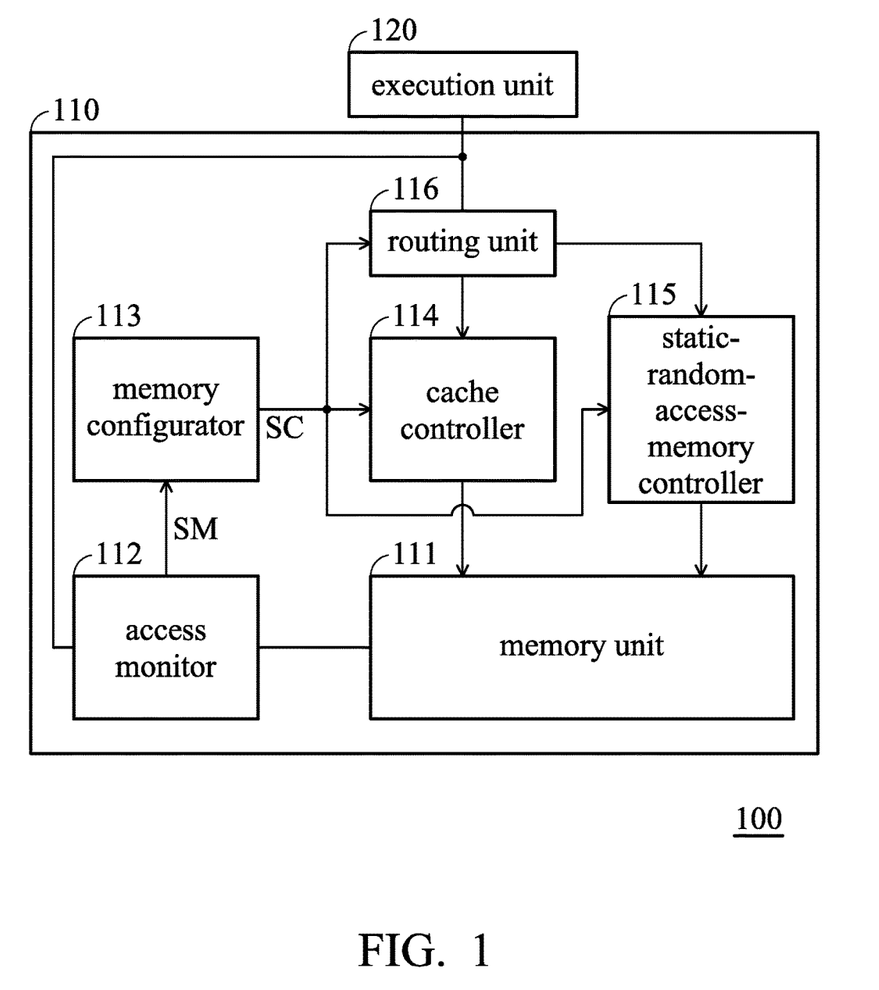
FIG. 1 is a block diagram of an execution device in accordance with an embodiment of the invention.

FIG. 1 is a block diagram of an execution device in accordance with an embodiment of the invention. As shown in FIG. 1, the execution device 100 includes the storage device 110 and the execution unit 120, where the execution unit 120 is coupled to the storage device 110. According to an embodiment of the invention, the execution device 100 is a hardware accelerator, and the storage device 110 is the inner storage in the hardware accelerator, which is configured to buffer the payloads of the hardware accelerator. The invention is not intended to be limited thereto. According to another embodiment of the invention, the execution unit 120 is a microprocessor.

The storage device 110 includes a memory unit 111, an access monitor 112, a memory configurator 113, a cache controller 114, a static random-access memory controller 115, and a routing unit 116. The execution unit 120 writes data into the memory unit 111 and reads data from the memory unit 111.

The memory unit 111 includes a plurality of memory blocks. The access mode of any of the memory blocks can be configured to be either a cache mode or a static random-access memory mode by the technology disclosed herein.

The access monitor 112 is configured to monitor whether the access mode of the memory unit 111 is in a continuous-access mode or a random-access mode, to generate a monitor signal SM. When the memory configurator 113 determines that the access mode of the memory unit 111 is in the continuous-access mode or the random-access mode according to the monitor signal SM, the memory configurator 113 configures any of the memory blocks in the memory unit 111 to be either in the cache mode or the static random-access memory mode to generate a configuration signal SC. According to an embodiment of the invention, the memory configurator 113 may dynamically configure all memory blocks in the memory unit 111 to be in the cache mode or the static random-access memory mode, and may also configure, according to a proportion, a part of memory blocks to be in the cache mode while the other part of memory blocks to be in the static random-access memory mode.

According to an embodiment of the invention, the access monitor 112 monitors that the access mode of a predetermined address range in the memory unit 111 is the continuous-access mode or the random-access mode. For example, the predetermined address range is a watching window with 4K addresses from the initial address. When the address of an access request seeking access to the memory unit 111 is beyond the predetermined address range, the access monitor 112 generates a monitor signal SM to inform the memory configurator 113 to configure. According to another embodiment of the invention, the access monitor 112 monitors that the access mode of a command packet of data is the continuous-access mode or the random-access mode to generate a monitor signal SM. According to another embodiment of the invention, the memory configurator 113 may dynamically configure the memory unit 111 according to the monitoring result generated by the access monitor 112 at fixed time intervals.

According to an embodiment of the invention, when the memory configurator 113 determines, according to the monitor signal SM, that the access mode of the memory unit 111 is in the random-access mode, the memory configurator 113 configures most of the memory blocks in the memory unit 111 to be in the cache mode and records the address information about the memory blocks configured in the cache mode in the configuration information which may be stored in the registers (not shown) in the memory configurator 113. When the execution unit 120 generates the access request with the addresses corresponding with the memory blocks configured to be in the cache mode, the routing unit 116 routes the access request to the cache controller 114 according to the configuration signal SC. The cache controller 114 operates, according to the configuration signal SC, the memory blocks in the memory unit 111 which are configured to be in the cache mode.

According to another embodiment of the invention, when the memory configurator 113 determines, according to the monitor signal SM, that the access mode of the memory unit 111 is in the continuous-access mode, the memory configurator 113 configures most of the memory blocks in the memory unit 111 to be in the static random-access memory mode and records the address information about the memory blocks configured in the static random-access memory mode in the configuration information which may be stored in the registers (not shown) in the memory configurator 113. When the execution unit 120 generates the access request with the addresses corresponding with the memory blocks configured to be in the static random-access memory mode, the routing unit 116 routes the access request to the static random-access memory controller 115 according to the configuration signal SC. The static random-access memory controller 115 operates, according to the configuration signal SC, the memory blocks in the memory unit 111 which are configured to be in the static random-access memory mode.

The address range of the memory blocks configured to be in the cache mode and that of the memory blocks configured to be in the static random-access memory mode are both recorded in the configuration information stored in the memory configurator 113. The memory configurator 113 generates the configuration signal SC according to the configuration information.

The routing unit 116 routes the access request to the cache controller 114 or the static random-access memory controller 115 according to the configuration signal SC and the address of the access request from the execution unit 120. The execution unit 120 thus accesses the memory unit 111 through the cache controller 114 or the static random-access memory controller 115.

Figure 2:
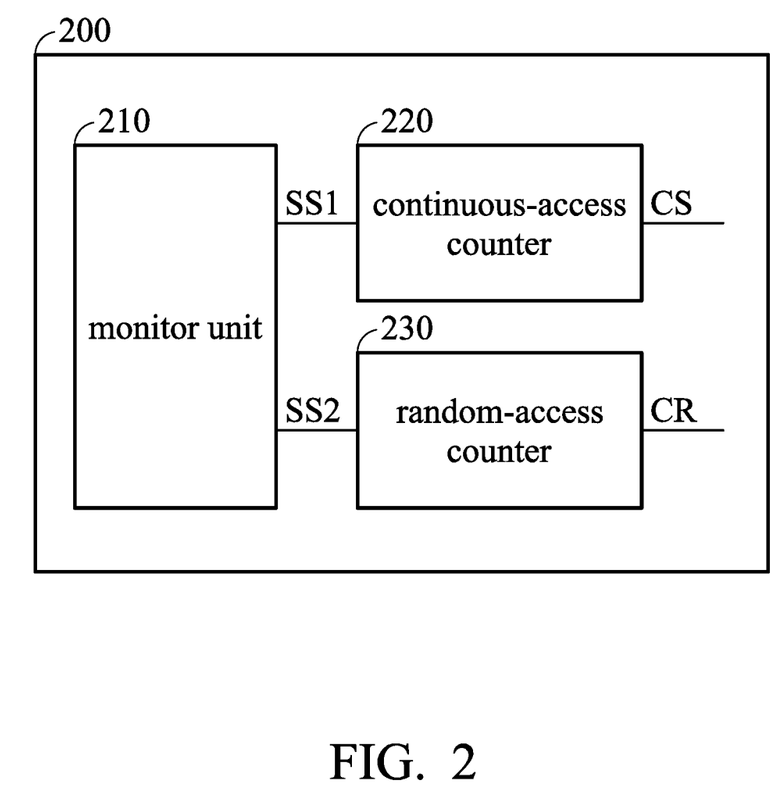
FIG. 2 is a block diagram of an access monitor in accordance with an embodiment of the invention.

FIG. 2 is a block diagram of an access monitor in accordance with an embodiment of the invention. As shown in FIG. 2, the access monitor 200 includes a monitor unit 210, a continuous-access counter 220, and a random-access counter 230, where the access monitor 200 in FIG. 2 corresponds with the access monitor 112 in FIG. 1.

The monitor unit 210 is configured to monitor the addresses of two sequential access requests from the execution unit 120 in FIG. 1 for accessing the memory unit 111 to generate the first signal SS1 or the second signal SS2. The continuous-access counter 210 counts a continuous-access count CS according to the first signal SS1, and the random-access counter 220 counts a random-access count CR according to the second signal SS2.

According to an embodiment of the invention, when the monitor unit 210 detects that the addresses of the two sequential access requests are continuous, the monitor unit 210 generates the first signal SS1 such that the continuous-access counter 210 increases the continuous-access count CS according to the first signal SS1. According to another embodiment of the invention, when the monitor unit 210 detects that a difference between the addresses of the two sequential access requests exceeds a predetermined threshold, the monitor unit 210 generates the second signal SS2 such that the random-access counter 220 increases the random-access count CR according to the second signal SS2.

Figure 3A:
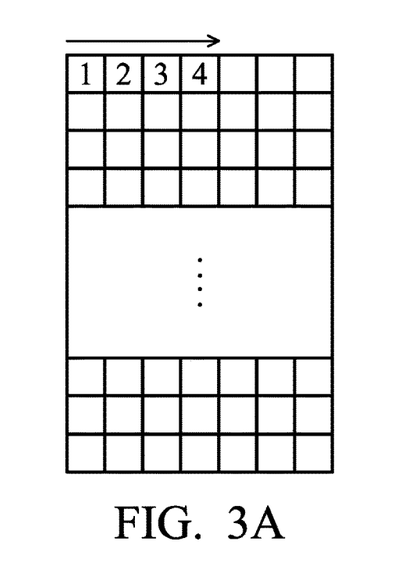
FIGS. 3A-3C are schematic diagrams showing the access modes in accordance with some embodiments of the invention.
Figure 3B:
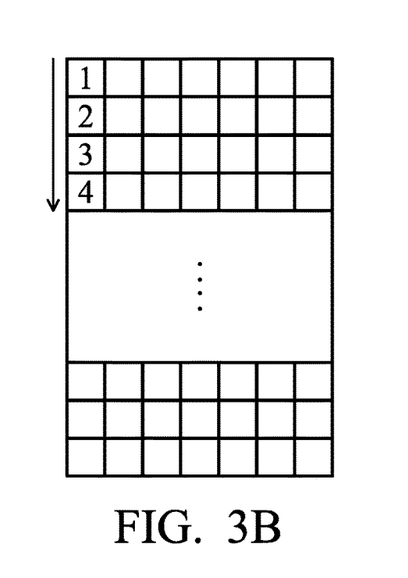
Figure 3C:
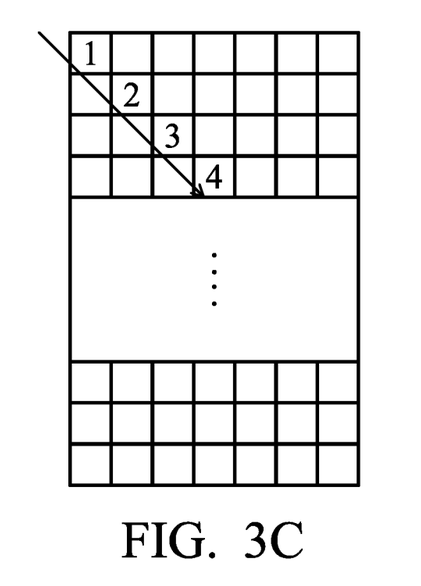

FIGS. 3A-3C are schematic diagrams showing the access modes in accordance with some embodiments of the invention. As shown in FIG. 3A, the access requests from the execution unit 120 in FIG. 1 are to sequentially access the addresses of the memory unit 111. The monitor unit 210 in FIG. 2 determines that the addresses of two sequential access requests are sequential or continuous to generate the first signal SS1, such that the continuous-access counter 220 in FIG. 2 increases the continuous-access count CS by 1.

As shown in FIG. 3B, there is a fixed difference between the addresses of the two sequential access requests from the execution unit 120 in FIG. 1. The monitor unit 210 in FIG. 2 determines that the addresses of the two sequential access requests are non-continuous to generate the second signal SS2, such that the random-access counter 230 in FIG. 2 increases the random-access count CR by 1.

As shown in FIG. 3C, there is a non-fixed difference between the addresses of the two sequential access requests from the execution unit 120 in FIG. 1. The monitor unit 210 in FIG. 2 determines that the addresses of the two sequential access requests are non-continuous to generate the second signal SS2, such that the random-access counter 230 in FIG. 2 increases the random-access count CR by 1.

The access mode shown in FIGS. 3A-3C, is merely for the purposes of illustration, and is not intended to be limiting.

Back to FIG. 2, the continuous-access counter 220 and the random-access counter 230 count the access status of the access requests seeking access to the watching window with a predetermined address range from an initial address in the memory unit 111, for the memory configurator 113 to determine which mode to configure the memory unit 111 in. When the counting number of continuous-access counter 220 exceeds the counting number of random-access counter 230 by a first difference value or the counting number of random-access counter 230 exceeds the counting number of continuous-access counter 220 by a second difference value, the memory configurator 113 provided herein dynamically configures the memory unit 111. According to other embodiments in the invention, in order to prevent the configuration from triggering too often, the configuration of the memory configurator 113 dynamically configuring the memory unit 111 may be triggered at fixed time intervals, and may also be triggered when receiving an access request to access an address exceeding the predetermined address range, such as a watching window with 4K addresses.

According to an embodiment of the invention, the strategy used by the memory configurator 113 to configure the memory unit 111 is as follows:

When the counting number of continuous-access counter 220 exceeds that of the random-access counter 230 by a first difference value, the memory configurator 113 configures a first number of memory blocks in the memory unit 111 to be in the static random-access memory mode, and configures a second number of memory blocks in the memory unit 111 to be in the cache mode, where the first number exceeds the second number. That is, most, or all, of the memory blocks in the memory unit 111 are configured to be in the static random-access memory mode. In the invention, when the memory configurator 113 provided herein predicts, according to the regular pattern of the addresses of the access requests, that the addresses of the following access requests may be continuous in a large area, most, or all, of the memory blocks are configured to be in the static random-access memory mode. Since the data-accessed-unit in the static random-access memory mode is greater (such as, 4K) and the data may also be accessed by Direct Memory Access (DMA), the static random-access memory mode is suitable for an access request that is tolerable to greater latency and that is to access large and continuous data. It should be noted that a large number of access requests in the hardware accelerator belong to such stream access requests.

When the counting number of random-access counter 230 exceeds that that of the continuous-access counter 220 by a second difference value, the memory configurator 113 configures a first number of memory blocks in the memory unit 111 to be in the cache mode and configures a second number of memory blocks in the memory unit 111 to be in the static random-access memory modem, where the first number exceeds the second number. That is, most, or all, of the memory blocks in the memory unit 111 are configured to be in the cache mode. In the invention, when the memory configurator 113 provided herein predicts, according to the regular pattern of the addresses of the access requests, that the addresses of the following access requests may be non-continuous in a large area, most, or all, of the memory blocks are configured to be in the cache mode while the data-accessed-unit in the cache mode is smaller (such as, 64 bytes in a cache line). Since the cache provides a pre-fetch function, the data could be accessed with a fast speed and small latency so that the cache mode is suitable for an access request that tolerable to smaller latency.

The dynamic configuration of the memory unit 111 stated above is merely for the purposes of illustration, and is not intended to be limited thereto. The memory configurator 113 may adopt other strategies according to the access mode monitored by the access monitor 112. In the invention, the memory blocks of the memory unit 111 are dynamically configured to be in the cache mode or the static random-access memory mode by monitoring the access mode of the memory unit 111, such as monitoring the regular pattern of the addresses of the access requests to configure the memory blocks of the memory unit 111 to be in the cache mode or the static random-access memory mode, for providing different access modes to different access requests. Accessing efficiency is thus improved.

Figure 4:
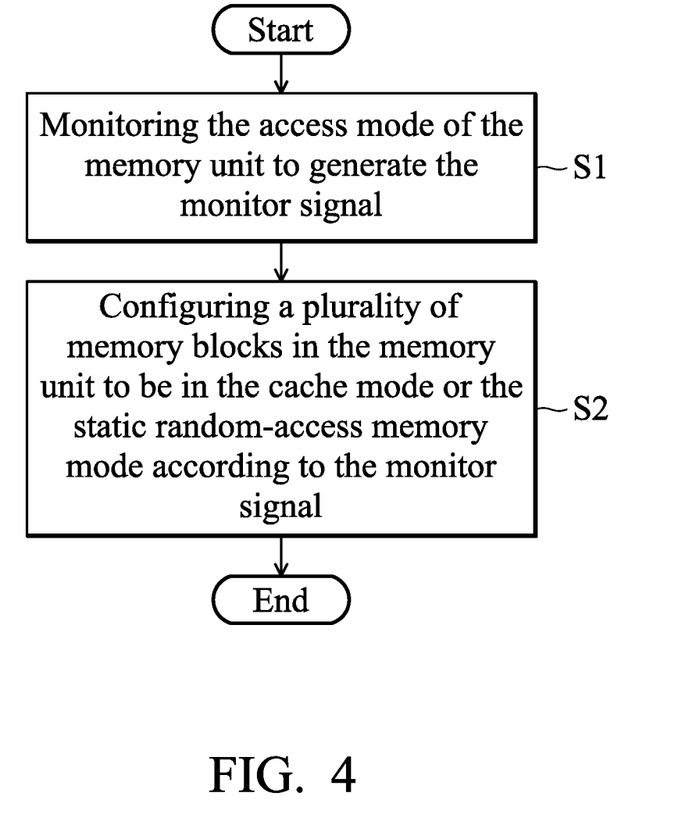
FIG. 4 is a flow chart of a configuration method in accordance with an embodiment of the invention.

FIG. 4 is a flow chart of a configuration method in accordance with an embodiment of the invention. The following description to the flow chart in FIG. 4 will be discussed with FIG. 1 for detailed explanation. The access monitor 112 monitors the access mode of the memory unit 111 to generate a monitor signal SM (Step S1). Then, any of memory blocks in the memory unit 111 is configured to be in the cache mode or the static random-access memory mode according to the monitor signal SM (Step S2). The configuration method provided herein is to monitor the access request seeking access to the memory unit 111, such as monitoring the regular pattern of the addresses. When predicting that the addresses of the following access request are continuous in a large area, most, or all, of the memory blocks in the memory unit 111 are configured to be in the static random-access memory mode to adapt to access requests that are tolerable to greater latency and that are to access large and continuous data. When predicting that the addresses of the following access request are random and non-continuous, most, or all, of the memory blocks in the memory unit 111 are configured to be in the cache mode to adapt to access requests that are tolerable to smaller latency.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A storage device, comprising:
a memory unit, comprising a plurality of memory blocks;

an access monitor, configured to monitor whether an access mode of the memory unit is a continuous-access mode or a random-access mode, to generate a monitor signal; and a memory configurator, configuring, according to the monitor signal, any of the memory blocks to be either in a cache mode or a static random-access memory mode to generate a configuration signal.

2. The storage device of claim 1, wherein the access monitor monitors whether the access mode of a predetermined address range in the memory unit is the continuous-access mode or the random-access mode, wherein when an address of an access request seeking access to the memory unit exceeds the predetermined address range, the access monitor generates the monitor signal to inform the memory configurator.

3. The storage device of claim 1, further comprising:
a cache controller, wherein when the memory configurator configures a first memory block of the memory blocks in the memory unit to be in the cache mode, the cache controller operates the first memory block according to the configuration signal;
a static random-access memory controller, wherein when the memory configurator configures a second memory block of the memory blocks in the memory unit to be in the static random-access memory mode, the static random-access memory controller operates the second memory block according to the configuration signal; and
a routing unit, routing an access request to the cache controller or the static random-access memory controller according to the configuration signal and an address of the access request from an execution unit, so that the execution unit is able to access the memory unit.

4. The storage device of claim 1, wherein the access monitor further comprises:
a monitor unit, monitoring whether addresses of two continuous access requests seeking access to the memory unit are continuous, wherein when the addresses of the two continuous access requests are continuous, the monitor generates a first signal, wherein when a difference between the addresses of the two continuous access requests exceeds a predetermined range, the monitor unit generates a second signal; and
a continuous-access counter, increasing a continuous-access count according to the first signal; and
a random-access counter, increasing a random-access count according to the second signal.

5. The storage device of claim 4, wherein when the continuous-access count exceeds the random-access count by a first difference value, the memory configurator configures a first number of memory blocks in the memory unit to be in the static random-access memory mode and configures a second number of memory blocks to be in the cache mode, wherein the first number exceeds the second number.

6. The storage device of claim 4, wherein when the random-access count exceed the continuous-access count by a second difference value, the memory configurator configures a first number of memory blocks in the memory unit to be in the cache mode and configures a second number of memory blocks to be in the static random-access memory mode, wherein the first number exceeds the second number.

7. The storage device of claim 4, wherein when an address of an access request seeking access to the memory unit exceeds a predetermined address range, the access monitor generates the monitor signal to inform the memory configurator to read the continuous-access count and the random-access count.

8. The storage device of claim 4, wherein, at fixed time intervals, the access monitor generates the monitor signal to inform the memory configurator to read the continuous-access count and the random-access count.

9. The storage device of claim 1, wherein the memory configurator records configuration information, wherein the configuration information comprises an address range of the memory blocks configured to be in the cache mode and ddress range of the memory blocks configured to be in the static random-access memory mode, wherein the memory configurator generates the configuration signal according to the configuration information.

10. The storage device of claim 1, wherein the storage device is deposited in a hardware accelerator, wherein the memory unit is configured to buffer payloads of the hardware accelerator.

11. A configuration method, adapted in a memory unit comprising a plurality of memory blocks, comprising:
monitoring whether an access mode of the memory unit is a continuous-access mode or a random-access mode, to generate a monitor signal; and
configuring any of the memory blocks to be either in a cache mode or a static random-access memory mode according to the monitor signal, to generate a configuration signal.

12. The configuration method of claim 11, wherein the step of monitoring whether the access mode of the memory unit is the continuous-access mode or the random-access mode to generate the monitor signal further comprises:
monitoring whether an access mode on a predetermined address range in the memory unit is the continuous-access mode or the random-access mode; and
when an address of an access request seeking access to the memory unit exceeds the predetermined address range, generating the monitor signal to configure any of the memory blocks to be either in the cache mode or the static random-access memory mode.

13. The configuration method of claim 11, further comprising:
when a first memory block of the memory blocks in the memory unit is configured to be in the cache mode, operating the first memory block according to the configuration signal via a cache controller;
when a second memory block of the memory blocks in the memory unit is configured to be in the static random-access memory mode, operating the second memory block according to the configuration signal via a static random-access memory controller; and
routing an access request to the cache controller or the static random-access memory controller according to the configuration signal and the address of the access request from an execution unit.

14. The configuration method of claim 11, wherein the step of monitoring whether the access mode of the memory unit is the continuous-access mode or the random-access mode to generate the monitor signal further comprises:
monitoring whether addresses of two continuous access requests seeking access to the memory unit are continuous;
generating a first signal when the addresses of the two continuous access requests are continuous;
increasing a continuous-access count according to the first signal;

generating a second signal when a difference of the addresses of the two continuous access requests exceeds a predetermined range; and increasing a random-access count according to the second signal.

15. The configuration method of claim 14, wherein the step of monitoring whether the access mode of the memory unit is the continuous-access mode or the random-access mode to generate the monitor signal further comprises:

when the continuous-access count exceeds the random-access count by a first difference, configuring a first number of memory blocks in the memory unit to be in the static random-access memory mode and configuring a second number of memory blocks in the memory unit to be in the cache mode, wherein the first number exceeds the second number.

16. The configuration method of claim 14, wherein the step of monitoring whether the access mode of the memory unit is the continuous-access mode or the random-access mode to generate the monitor signal further comprises:

when the random-access count exceeds the continuous-access count by a second difference value, configuring a first number of memory blocks in the memory unit to be in the cache mode and configuring a second number of memory blocks in the memory unit to be in the static random-access memory mode, wherein the first number exceeds the second number.

17. The configuration method of claim 14, wherein the step of monitoring whether the access mode of the memory unit is the continuous-access mode or the random-access mode to generate the monitor signal further comprises:

when an address of an access request seeking access to the memory unit exceeds a predetermined address range, generating the monitor signal; and reading the continuous-access count and the random-access count according to the monitor signal.

18. The configuration method of claim 14, wherein the step of monitoring whether the access mode of the memory unit is the continuous-access mode or the random-access mode to generate the monitor signal further comprises:

generating the monitor signal at fixed time intervals; and reading the continuous-access count and the random-access count according to the monitor signal.

19. The configuration method of claim 11, further comprising:

recording configuration information, wherein the configuration information comprises an address range of the memory blocks configured to be in the cache mode and an address range of the memory blocks configured to be in the static random-access memory mode; and generating the configuration signal according to the configuration information.

20. The configuration method of claim 11, wherein the memory unit is deposited in a hardware accelerator, wherein the memory unit is configured to buffer payloads of the hardware accelerator.

* * * * *